(12) United States Patent
Hull

(10) Patent No.: US 7,590,495 B2
(45) Date of Patent: Sep. 15, 2009

(54) INVERSE METHOD TO CALCULATE MATERIAL PROPERTIES USING A NON-RESONANT TECHNIQUE

(75) Inventor: Andrew J. Hull, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 138 days.

(21) Appl. No.: 11/772,280

(22) Filed: Jul. 2, 2007

(65) Prior Publication Data

US 2009/0007671 A1     Jan. 8, 2009

(51) Int. Cl.
    *G01M 7/02*     (2006.01)
(52) U.S. Cl. .......................... 702/33; 702/113; 702/65; 702/30; 73/760; 73/596; 73/579; 73/658; 73/660; 73/662; 73/663; 700/29; 700/299; 324/663; 324/687; 324/688; 324/690
(58) Field of Classification Search .................. 702/56, 702/108, 115, 114, 113, 182, 65, 30, 33; 73/760, 596, 73, 74, 61.48, 61.49, 579, 658, 73/659, 660, 662, 663; 324/663, 687, 688, 324/690, 228; 374/53, 54
See application file for complete search history.

(56) References Cited

U.S. PATENT DOCUMENTS

| | | | | |
|---|---|---|---|---|
| 5,121,629 A * | 6/1992 | Alba | ......................... | 73/61.41 |
| 5,223,796 A * | 6/1993 | Waldman et al. | ............ | 324/687 |
| 5,900,736 A * | 5/1999 | Sovik et al. | ................. | 324/663 |
| 6,848,311 B1 * | 2/2005 | Hull | ............................ | 73/579 |
| 6,941,231 B2 * | 9/2005 | Zeroug et al. | ................. | 702/39 |
| 7,010,981 B1 * | 3/2006 | Hull | ............................ | 73/602 |
| 7,062,386 B1 * | 6/2006 | Hull | ............................ | 702/39 |
| 7,219,024 B2 * | 5/2007 | Gamache et al. | ............. | 702/65 |
| 7,451,657 B2 * | 11/2008 | Goldfine et al. | .............. | 73/760 |
| 2004/0054474 A1 * | 3/2004 | Zeroug et al. | ................. | 702/1 |
| 2005/0171703 A1 * | 8/2005 | Goldfine et al. | .............. | 702/30 |
| 2006/0009865 A1 * | 1/2006 | Goldfine et al. | .............. | 700/29 |

* cited by examiner

*Primary Examiner*—Carol S Tsai
(74) *Attorney, Agent, or Firm*—James M. Kasischke; Michael P. Stanley; Jean-Paul A. Nasser

(57) ABSTRACT

A method for calculating material properties of a material includes determining a dilatational wavespeed and a shear wave speed. The dilatational wavespeed is determined by conducting vertical vibration tests of two specimens of the material, one specimen being twice as thick as the other. Transfer functions are obtained from these tests and used to calculate the dilatational wavespeed. The shear wavespeed is determined by conducting horizontal vibration tests of two specimens with one specimen being twice as thick as the other. The shear wavespeed can be calculated from transfer functions obtained from these tests and the dilatational wavespeed. Other material properties can be calculated from the dilatational and shear wavespeeds. Frequency dependence of the properties can be determined by conducting the tests at different frequencies.

14 Claims, 11 Drawing Sheets

INVERSE METHOD TO CALCULATE MATERIAL PROPERTIES USING A NON-RESONANT TECHNIQUE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to material properties measurement and, more particularly, to a method for measuring material properties using non-resonant techniques.

(2) Description of the Prior Art

Measuring the mechanical properties of slab-shaped (i.e., plates) materials are important because these parameters significantly contribute to the static and dynamic response of structures built with such materials. One characteristic that most elastomeric solids possess is that when they are subjected to large static forces (or pressure) their rigidity changes. Materials that have one set of mechanical properties at a when subjected to increased pressure. The ability to determine the pressure dependence of material properties is extremely important for modeling the behavior of systems comprised of these materials.

Resonant techniques have been used to identify and measure longitudinal and shear properties for many years. These methods are based on comparing measured eigenvalues to modeled eigenvalues and calculating the resulting material properties. These methods do not account for static pressure or large compressive forces. Additionally, they typically require long, slender materials to perform the measurement process. Comparison of analytical models to measured frequency response functions is another method used to estimate stiffness and loss parameters of a structure. When the analytical model agrees with one or more frequency response functions, the parameters used to calculate the analytical model are considered accurate. If the analytical model is formulated using a numerical method, a comparison of the model to the data can be difficult due to dispersion properties of the materials. These methods do not take into account large compressive forces.

Some efforts have been made to measure material properties under large pressures. These methods consist of placing materials in pressurized settings, insonifying them, and then measuring their response. These methods are difficult because they have to be conducted under great atmospheric pressure that can adversely effect the instrumentation. Safety issues can also arise in connection with laboratory testing at extreme pressures. Finally, a mass loaded long thin rod has been studied with respect to the bar wavespeed and corresponding Young's modulus. This work does not investigate shear motion.

Recently, a method to measure plate shaped materials subjected to large compressional forces was developed in U.S. Pat. No. 6,848,311 incorporated by reference herein. This method is based on a single plate-shaped specimen and requires a graphical search routine to locate and estimate the propagation wavenumbers of the specimen.

SUMMARY OF THE INVENTION

One object of this invention is to accurately determine the material properties of a plate-shaped material specimen subjected to large static compressional forces.

The general purpose of this invention is to demonstrate a method to measure (or estimate) the complex frequency-dependent dilatational and shear wavenumbers of specimens subjected to large static compressional forces. The method uses two pieces of the same material where the thickness of the first piece is half the thickness of the second piece. This approach utilizes four transfer functions that are obtained by vibrating both mass-loaded materials in two different directions, one vertical and one horizontal. Once this is accomplished, the transfer functions are combined with two theoretical models and then manipulated so that closed form equations which estimate the dilatational and shear wavenumbers as explicit functions of data and known system parameters are produced. The wavenumbers are then combined to determine complex dilatational wavespeed, complex shear wavespeed, complex Lamé constants, complex Young's modulus, complex shear modulus, and complex Poisson's ratio. This technique is described below.

This is an improvement to the previous method as it eliminates the need for a graphical search routine. Once these parameters have been estimated, the complex frequency-dependent dilatational and shear wavespeeds, Young's and shear moduli and Poisson's ratio can also be calculated. A typical test configuration is shown in FIGS. 1-2, where a test shaker initiates mechanical energy onto the plate-shaped specimen materials that are mass loaded. This approach is intended for use when the material is to be placed in an environment where it will be subjected to large pressure forces. This typically arises in submarines, where the panels that coat the exterior of the submarine are exposed to a wide range of hydrostatic pressures. An inverse method is developed using four transfer function measurements that are combined to yield closed form equations of dilatational and shear wavenumbers at any given test frequency. Finally, dilatational and shear wavespeeds, Young's and shear moduli, and Poisson's ratio are then calculated.

BRIEF DESCRIPTION OF THE DRAWINGS

These and other features and advantages of the present invention will be better understood in view of the following description of the invention taken together with the drawings wherein.

DETAILED DESCRIPTION OF THE INVENTION

Figure 1:
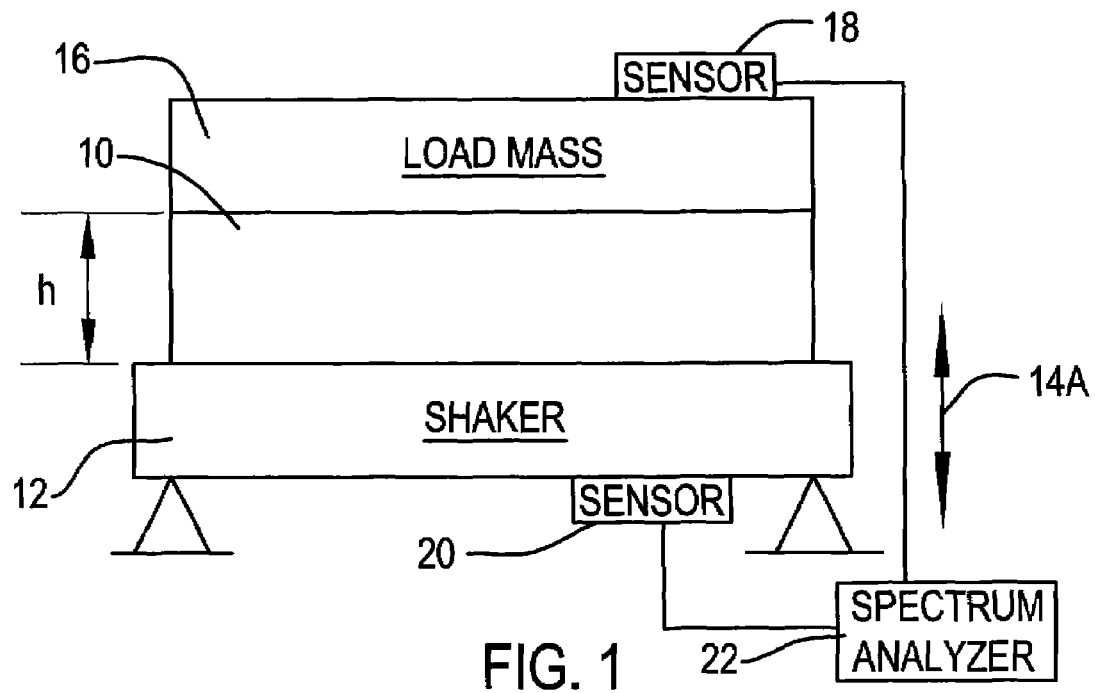
FIG. 1 is a diagram of a first test setup for the current invention.
Figure 2:
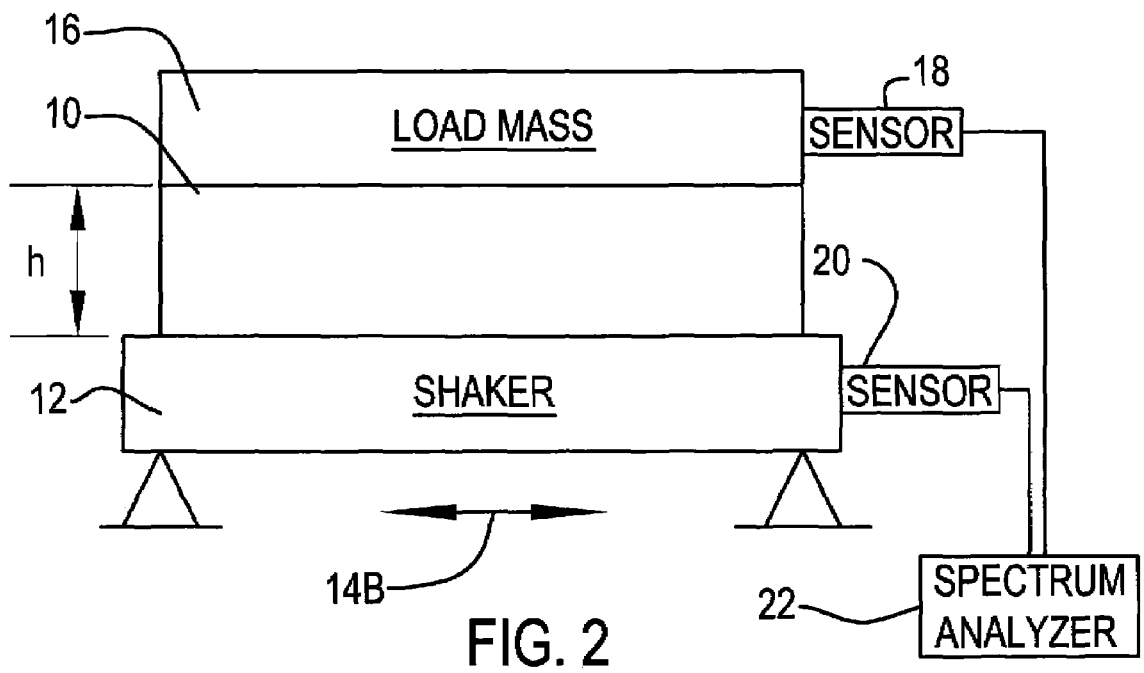
FIG. 2 is a diagram of a second test setup for the current invention.

The test procedure consists of vibrating a mass-loaded, slab-shaped test specimen 10 with a shaker 12 in two different directions, vertical 14A and horizontal 14B, as shown in FIGS. 1 and 2, respectively. It is noted that the mass 16 attached to the top of the material 10 must be sufficiently stiffer than the specimen 10 so that it can be modeled as lumped parameter expression rather than a continuous media system. A typical example would be steel attached above a rubber-like (or elastomeric) material giving a ratio of moduli of elasticity of greater than 100. Lower ratios result in less accurate estimations. Vibrating the shaker 12 causes different waveforms to propagate in the material 10. The inverse method developed here allows for the data from the experiments to be manipulated so that the complex dilatational and shear wavenumbers can be measured. This test is usually done at multiple frequencies (swept sine) so any frequency dependencies can be identified and measured. Input vibration data is collected from the shaker 12. A sensor 18 is mounted on load mass 16 and another sensor 20 is mounted on shaker 12 for collecting transfer function data. In FIG. 1, the test is set up for monitoring the vertical transfer function. FIG. 2 shows the test as set up for monitoring the horizontal transfer function. Sensors 18 and 20 should be oriented properly to capture the motion being measured. Other test configurations using directions other than vertical and horizontal are possible; however, the test setups shown are preferred for ease of set up and calculation. These sensors 18 can be either accelerometers that record accelerations, or laser velocimeters that record velocities. In the swept sine mode, transfer functions of acceleration divided by acceleration or velocity divided by velocity are both equal to displacement divided by displacement. The time domain data collected from the sensors 18 and 20 are Fourier transformed into the frequency domain and then recorded as complex transfer functions, typically using a spectrum analyzer 22.

Figure 3:
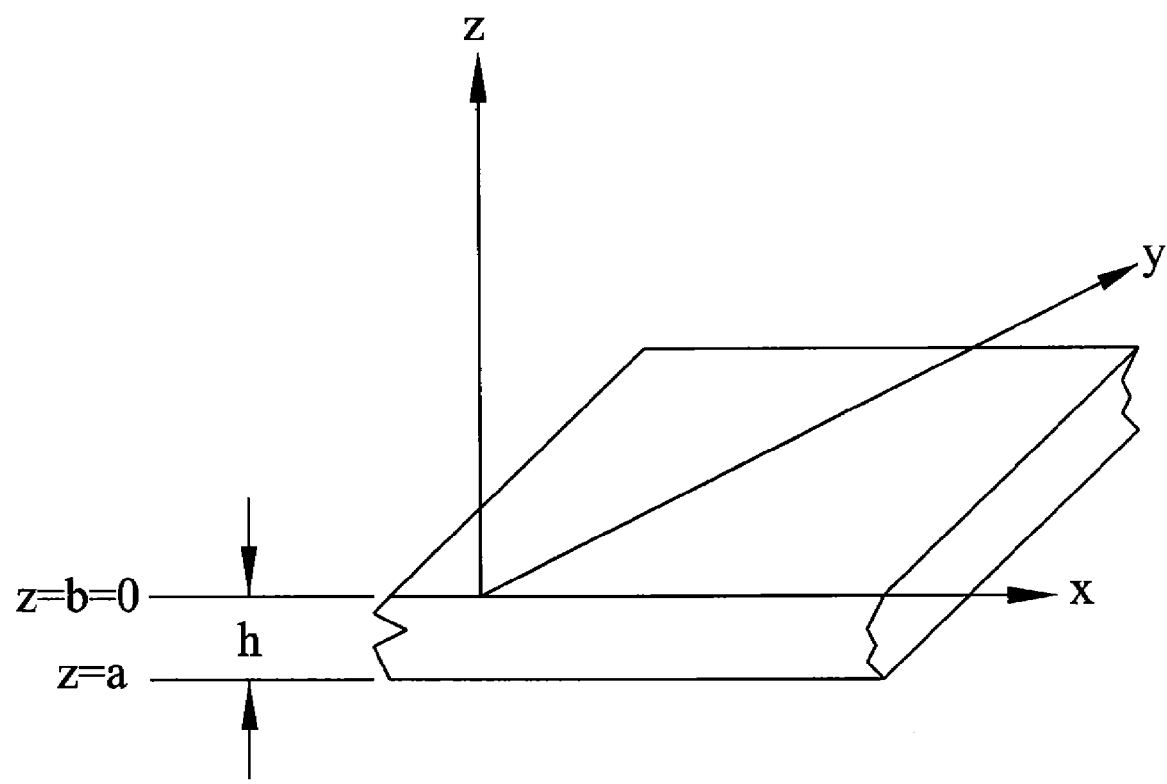
FIG. 3 is a diagram showing the coordinate system used by the current invention.

In this method, different thicknesses h of material are used to calculate material properties of the specimen material 10. Vertical and horizontal transfer functions are obtained at thickness $h=h_0$. Vertical and horizontal transfer functions are also obtained at a second thickness where $h=h_1=2h_0$. The coordinate system of the test configuration is shown in FIG. 3. Note that using this orientation results in b=0 and a having a value less than zero. The thickness of the specimen, h, is a positive value.

For the single thickness shaker-specimen-mass system shown in FIG. 1, the transfer function between the vertical base displacement and the vertical mass displacement can be written as $$T_1(\omega) = \frac{1}{R_1(\omega)} = \frac{U_z(0, b, \omega)}{U_0} = \frac{1}{\cos(k_d h) - \left(\frac{M}{\rho}\right) k_d \sin(k_d h)}, \quad (1)$$

where $T_1(\omega)$ or $R_1(\omega)$ correspond to the data from the vertical motion experiment using a single thickness specimen. In equation (1), M is the mass per unit area of the top mass (kg/m$^2$), $\rho$ is the density of the test specimen (kg/m$^3$), h is thickness of the test specimen (m), and $k_d$ is the dilatational wavenumber (rad/m) and is equal to $$k_d = \frac{\omega}{c_d}, \quad (2)$$

where $c_d$ is the dilatational wavespeed (m/s). For the double thickness shaker-specimen-mass system, the transfer function between the vertical base displacement and the vertical mass displacement can be written as $$T_2(\omega) = \frac{1}{R_2(\omega)} = \frac{U_z(0, b, \omega)}{U_0} = \frac{1}{\cos(2k_d h) - \left(\frac{M}{\rho}\right) k_d \sin(2k_d h)}, \quad (3)$$

where $T_2(\omega)$ or $R_2(\omega)$ correspond to the data from the vertical motion experiment using a double thickness specimen. For the single thickness shaker-specimen-mass system shown in FIG. 2, the transfer function between the horizontal base displacement and the horizontal mass displacement can be written as $$T_3(\omega) = \frac{1}{R_3(\omega)} = \frac{U_x(0, b, \omega)}{V_0} = \frac{1}{\cos(k_s h) - \left(\frac{M}{\rho}\right) k_s \sin(k_s h)}. \quad (4)$$

where $T_3(\omega)$ or $R_3(\omega)$ correspond to the data from the horizontal motion experiment using a single thickness specimen. In equation (4), $k_s$ is the shear wavenumber (rad/m) and is equal to $$k_s = \frac{\omega}{c_s}, \quad (5)$$

where $c_s$ is the shear wavespeed (m/s). For the double thickness shaker-specimen-mass system shown in FIG. 2, the transfer function between the horizontal base displacement and the horizontal mass displacement can be written as $$T_4(\omega) = \frac{1}{R_4(\omega)} = \frac{U_x(0, b, \omega)}{V_0} = \frac{1}{\cos(2k_s h) - \left(\frac{M}{\rho}\right) k_s \sin(2k_s h)}. \quad (6)$$

where $T_4(\omega)$ or $R_4(\omega)$ correspond to the data from the horizontal motion experiment using a double thickness specimen. The dilatational wavespeed is related to the Lamé constants using the equation $$c_d = \sqrt{\frac{\lambda + 2\mu}{\rho}} \quad (7)$$

and the relationship between the shear wavespeed and the Lamé constants is $$c_s = \sqrt{\frac{\mu}{\rho}}, \quad (8)$$

where $\lambda$ and $\mu$ are Lamé constants (N/m$^2$). The relationship of the Lamé constants to the Young's and shear moduli is shown as $$\lambda = \frac{E\upsilon}{(1+\upsilon)(1-2\upsilon)} \quad (9)$$

and $$\mu = G = \frac{E}{2(1+\upsilon)}, \quad (10)$$

where E is the complex Young's modulus (N/m$^2$), G is the complex shear modulus (N/m$^2$), and $\upsilon$ is the complex Poisson's ratio of the material (dimensionless).

The inverse solution for dilatational wavenumber can be determined by combining equations (1) and (3). A double angle trigonometric relationship is applied to both the sine and cosine terms in equation (2), and the resulting equation is combined with equation (1) to yield $$\cos(k_d h) = \frac{R_2 + 1}{2R_1} = \frac{T_1 + T_1 T_2}{2T_2} = \phi, \quad (11)$$

where $\phi$ is a complex quantity. The inversion of equation (11) allows the complex dilatational wavenumber to be solved as a function of $\phi$. The solution to the real part of $k_d$ is $$\mathrm{Re}(k_d) = \begin{cases} \frac{1}{2h}\mathrm{Arccos}(s) + \frac{n\pi}{2h} & n \text{ even} \\ \frac{1}{2h}\mathrm{Arccos}(-s) + \frac{n\pi}{2h} & n \text{ odd} \end{cases}, \quad (12)$$

where $$s = [\mathrm{Re}(\phi)]^2 + [\mathrm{Im}(\phi)]^2 - \sqrt{\{[\mathrm{Re}(\phi)]^2 + [\mathrm{Im}(\phi)]^2\}^2 - \{2[\mathrm{Re}(\phi)]^2 - 2[\mathrm{Im}(\phi)]^2 - 1\}}, \quad (13)$$

n is a non-negative integer and the capital A denotes the principal value of the inverse cosine function. The value of n is determined from the function s, which is a cosine function with respect to frequency. At zero frequency, n is 0. Every time s cycles through $\pi$ radians (180 degrees), n is increased by 1. When the solution to the real part of $k_d$ is found, the solution to the imaginary part of $k_d$ is then written as $$\mathrm{Im}(k_d) = \frac{1}{h}\log_e\left\{\frac{\mathrm{Re}(\phi)}{\cos[\mathrm{Re}(k_d)h]} - \frac{\mathrm{Im}(\phi)}{\sin[\mathrm{Re}(k_d)h]}\right\}. \quad (14)$$

The inverse solution for shear wavenumber can be determined by combining equations (4) and (6). A double angle trigonometric relationship is applied to both the sine and cosine terms in equation (6), and the resulting equation is combined with equation (4) to yield $$\cos(k_s h) = \frac{R_4 + 1}{2R_3} = \frac{T_3 + T_3 T_4}{2T_4} = \theta, \quad (15)$$

where $\theta$ is a complex quantity. The inversion of equation (11) allows the complex shear wavenumber to be solved as a function of $\theta$. The solution to the real part of $k_s$ is $$\mathrm{Re}(k_s) = \begin{cases} \frac{1}{2h}\mathrm{Arccos}(r) + \frac{m\pi}{2h} & m \text{ even} \\ \frac{1}{2h}\mathrm{Arccos}(-r) + \frac{m\pi}{2h} & m \text{ odd} \end{cases}, \quad (16)$$

where $$r = [\mathrm{Re}(\theta)]^2 + [\mathrm{Im}(\theta)]^2 - \sqrt{\{[\mathrm{Re}(\theta)]^2 + [\mathrm{Im}(\theta)]^2\}^2 - \{2[\mathrm{Re}(\theta)]^2 - 2[\mathrm{Im}(\theta)]^2 - 1\}}, \quad (17)$$

m is a non-negative integer and the capital A denotes the principal value of the inverse cosine function. The value of m is determined from the function r, which is a cosine function with respect to frequency. At zero frequency, m is 0. Every time r cycles through $\pi$ radians (180 degrees), m is increased by 1. When the solution to the real part of $k_s$ is found, the solution to the imaginary part of $k_s$ is then written as $$\mathrm{Im}(k_s) = \frac{1}{h}\log_e\left\{\frac{\mathrm{Re}(\theta)}{\cos[\mathrm{Re}(k_s)h]} - \frac{\mathrm{Im}(\theta)}{\sin[\mathrm{Re}(k_s)h]}\right\}. \quad (18)$$

The material properties can be determined from the wavenumbers. First, the dilatational and shear wavespeeds are determined using $$c_d = \frac{\omega}{k_d} \quad (19)$$

and $$c_s = \frac{\omega}{k_s}, \quad (20)$$

respectively. The Lamé constants are calculated using equations (7) and (8) written as $$\mu = \rho c_s^2 \quad (21)$$

and $$\lambda = \rho c_d^2 - 2\rho c_s^2. \quad (22)$$

Poisson's ratio is then calculated using $$\upsilon = \frac{\lambda}{2(\mu + \lambda)}. \quad (23)$$

Young's modulus can be calculated with $$E = \frac{\mu(2\mu + 3\lambda)}{(\mu + \lambda)} \quad (24)$$

and the shear modulus can be determined using $$G = \mu. \quad (25)$$

Figure 4A:
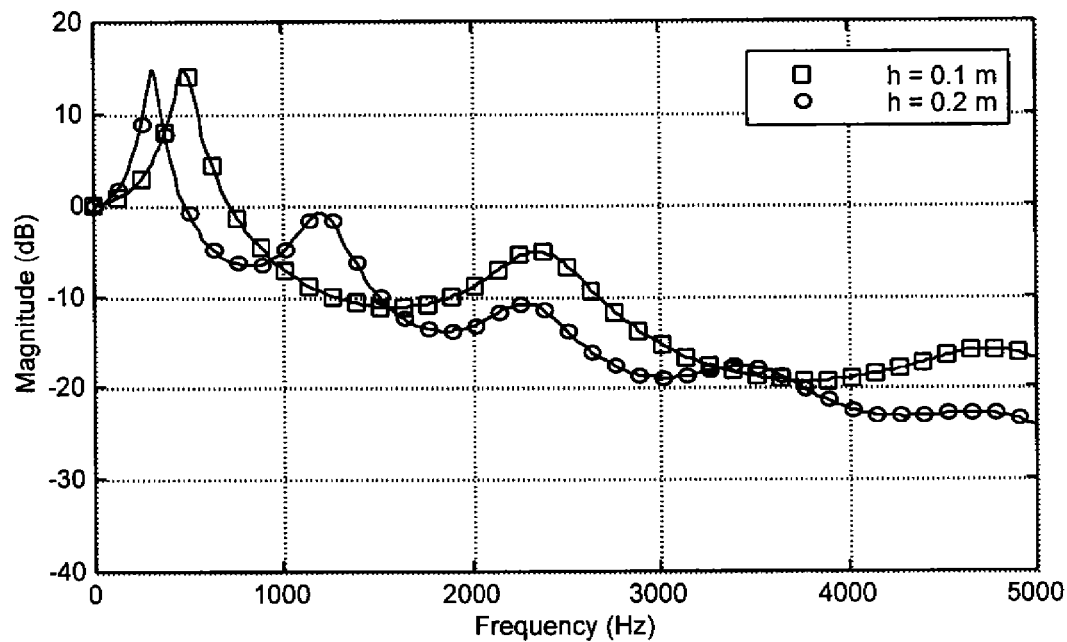
FIGS. 4A and 4B are graphs of the transfer function for vertical motion and phase angle versus frequency.
Figure 4B:
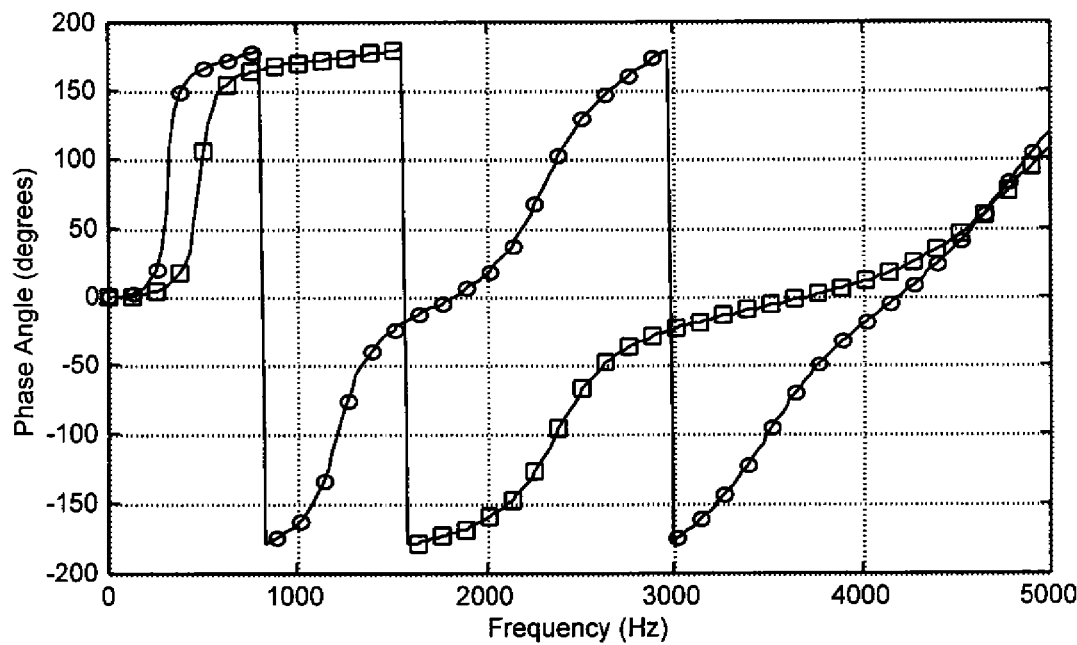
Figure 5A:
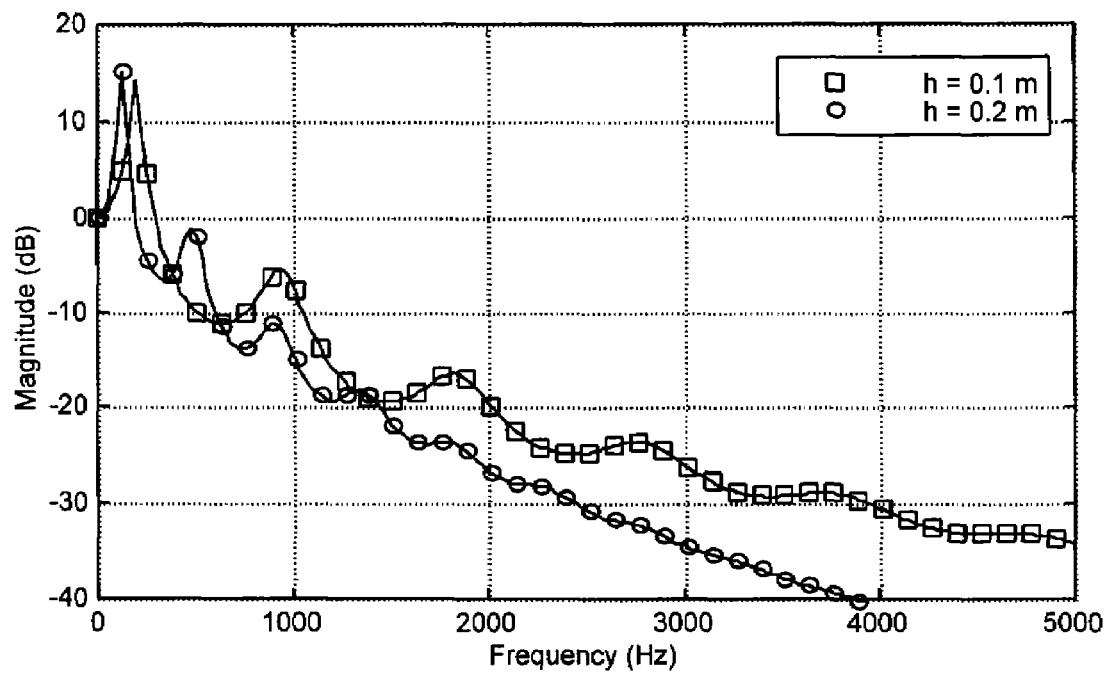
FIGS. 5A and 5B are graphs of the transfer function for horizontal motion and phase angle versus frequency.
Figure 5B:
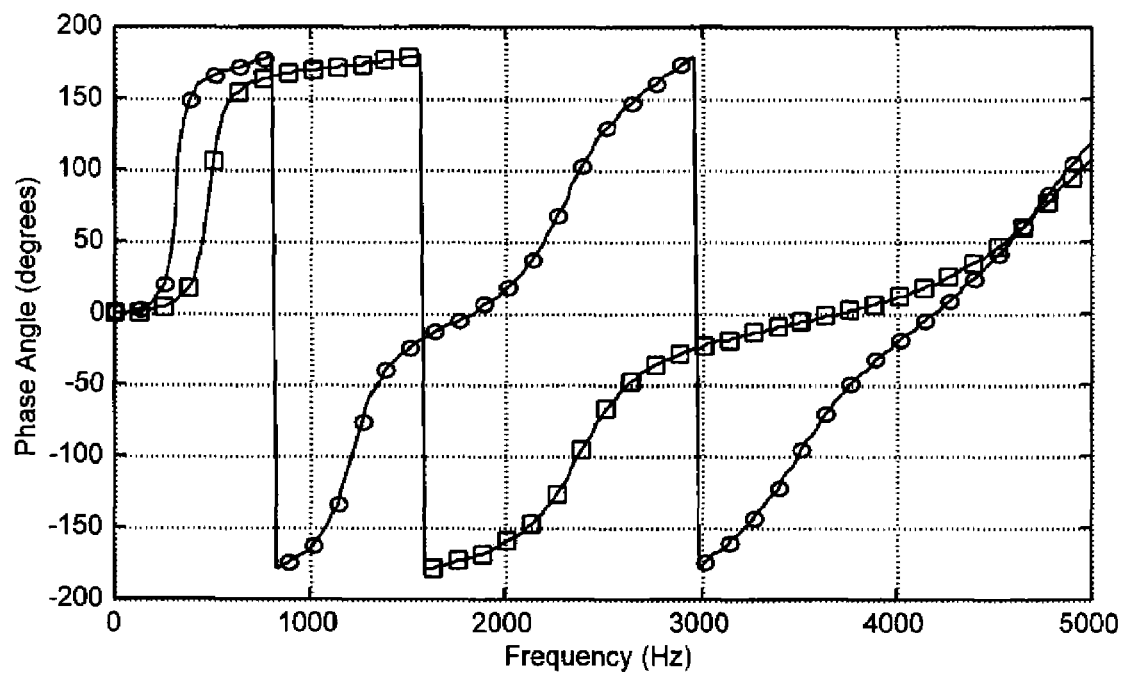

The above measurement method can be simulated by means of a numerical example. Soft rubber-like material properties of the test specimen are used in this simulation. The material has a Young's modulus E of $[(1\times10^8-i2\times10^7)+(5\times10^3f-i3\times10^2f)]N/m^2$ where f is frequency in Hz, Poisson's ratio $\upsilon$ is equal to 0.40 (dimensionless), density $\rho$ is equal to 1200 kg/m$^3$, and a thicknesses h of 0.1 m and 0.2 m. The top mass is a 0.0254 m (1 inch) steel plate that has a mass per unit area value M of 199 kg/m$^2$. FIG. 4A is a plot of the transfer function of the systems for vertical motion versus frequency and corresponds to equation (1) and (3). FIG. 4B is a plot of the phase angle of the systems motion. FIGS. 5A and 5B are plots of the transfer function of the systems for horizontal motion versus frequency and corresponds to equations (4) and (6). In FIGS. 4A and 5A the motion plots have magnitude in decibels, and FIGS. 4B and 5B show the phase angle in degrees.

Figure 6:
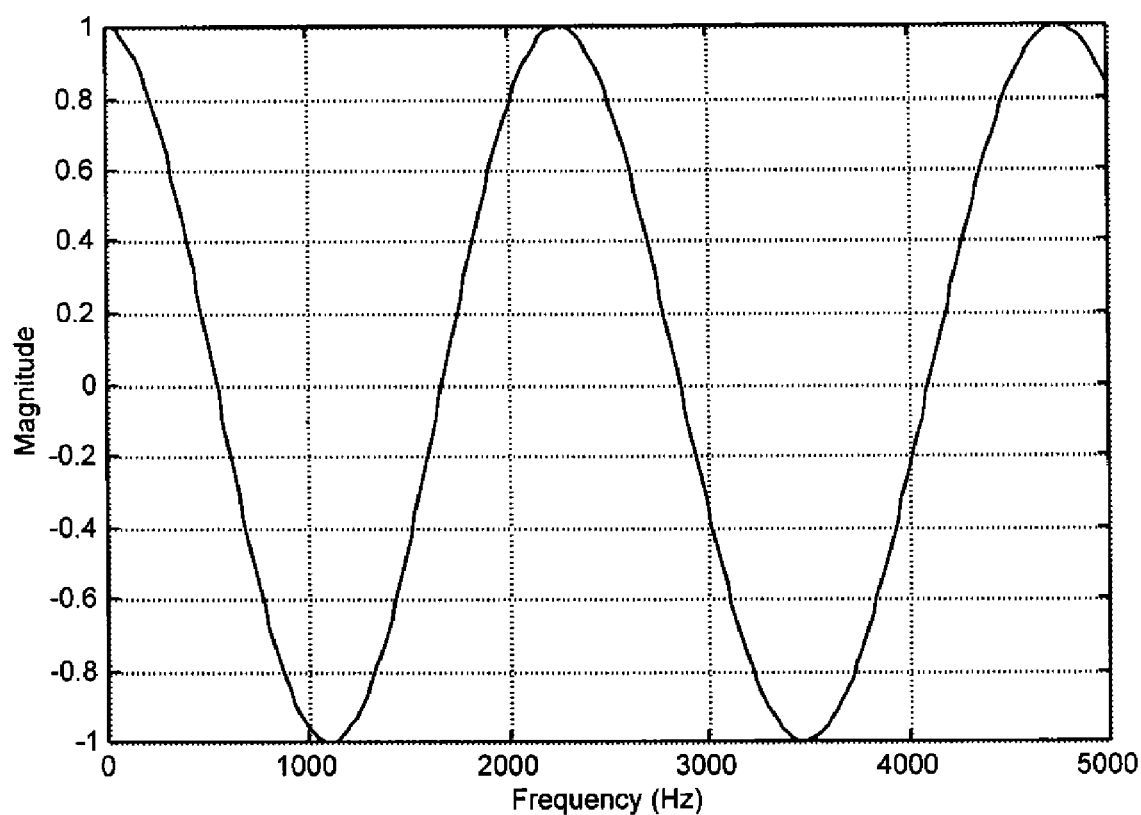
FIG. 6 is a plot of the function s versus frequency.

FIG. 6 is a plot of the function s versus frequency and corresponds to equation (13). The values for the indices n and the corresponding frequencies can be determined from the inspection of FIG. 6 and are listed in Table 1.

TABLE 1

The Value of n Versus Frequency

| n | Minimum Frequency (Hz) | Maximum Frequency (Hz) |
|---|---|---|
| 0 | 0 | 1100 |
| 1 | 1100 | 2257 |
| 2 | 2257 | 3476 |
| 3 | 3476 | 4753 |
| 4 | 4753 | 5000 |

Figure 7A:
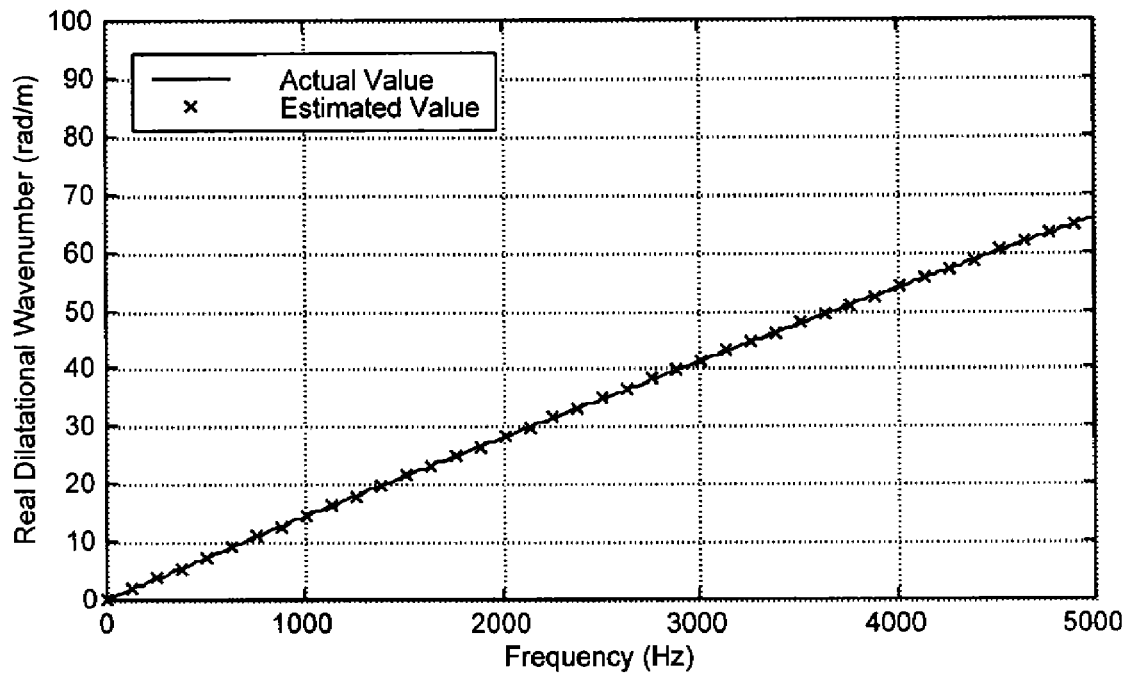
FIGS. 7A and 7B are plots of the real and imaginary portion of the dilatational wavenumber versus frequency.
Figure 7B:
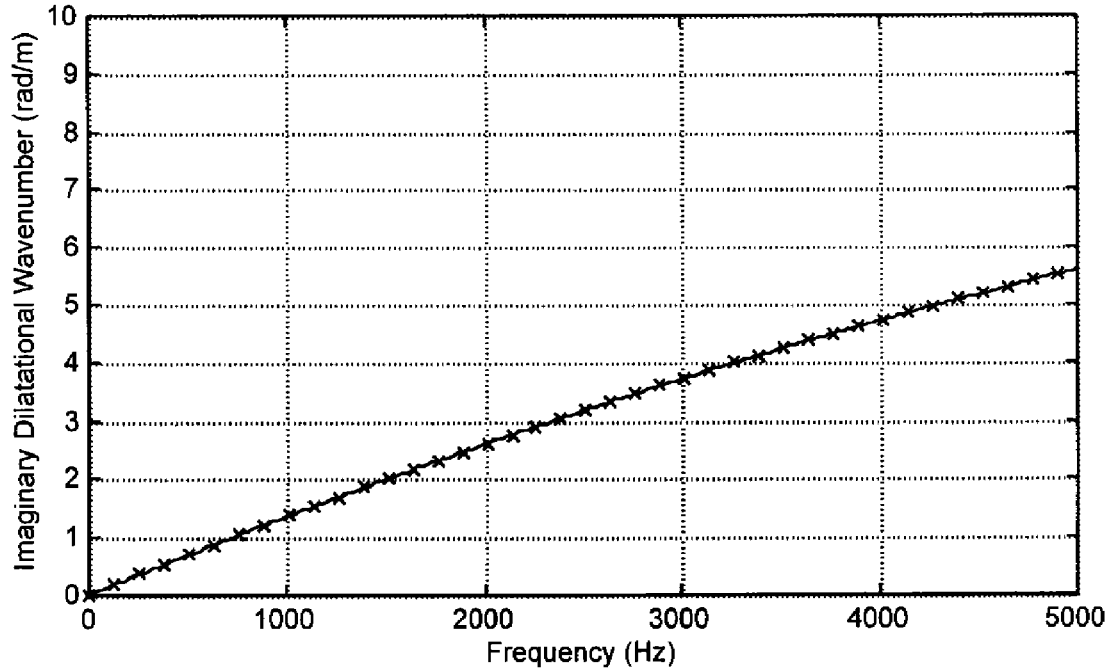
Figure 8:
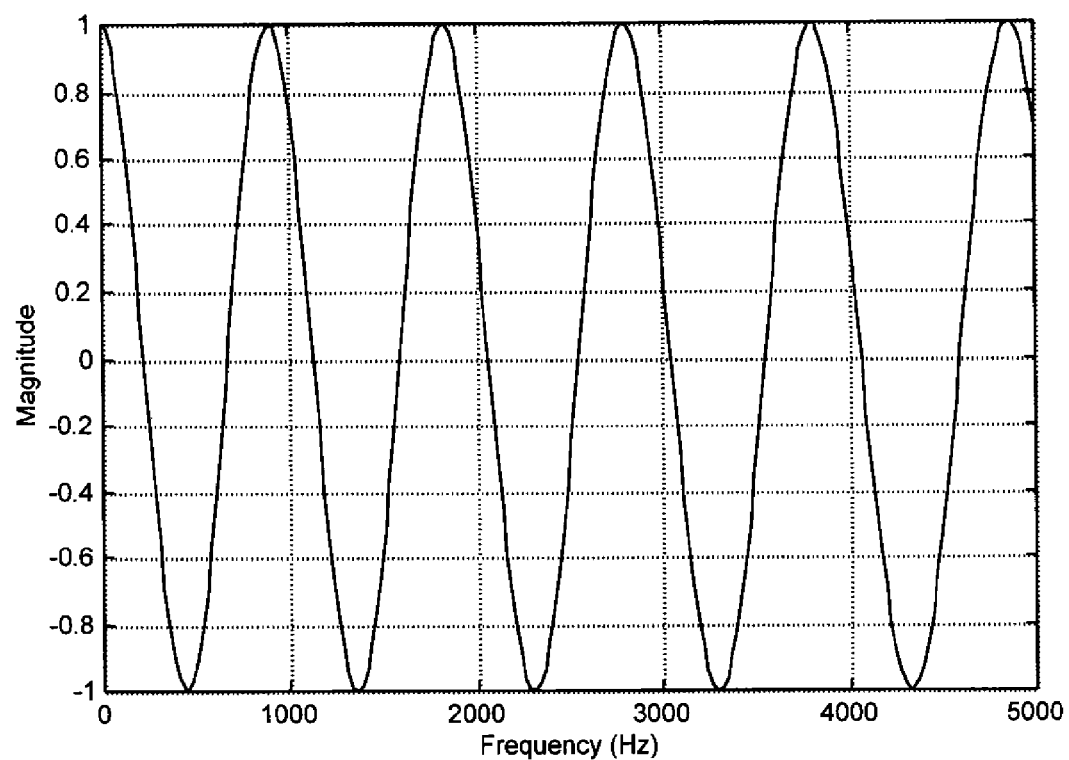
FIG. 8 is a plot of the function r versus frequency.

FIGS. 7A and 7B are plots of the real and imaginary portion of the dilatational wavenumber versus frequency. In both plots, the solid line is the actual wavenumber used to formulate the model and the x markers are the estimated values of the real and imaginary wavenumbers determined using equations (12) and (14), respectively. FIG. 8 is a plot of the function r versus frequency and corresponds to equation (17). The values for the indices m and the corresponding frequencies can be determined from the inspection of FIG. 8 and are listed in Table 2.

TABLE 2

The Value of m Versus Frequency

| m | Minimum Frequency (Hz) | Maximum Frequency (Hz) |
|---|---|---|
| 0 | 0 | 442 |
| 1 | 442 | 894 |
| 2 | 894 | 1355 |
| 3 | 1355 | 1826 |
| 4 | 1826 | 2306 |
| 5 | 2306 | 2797 |
| 6 | 2797 | 3297 |
| 7 | 3297 | 3808 |
| 8 | 3808 | 4330 |
| 9 | 4330 | 4862 |
| 10 | 4753 | 5000 |

Figure 9A:
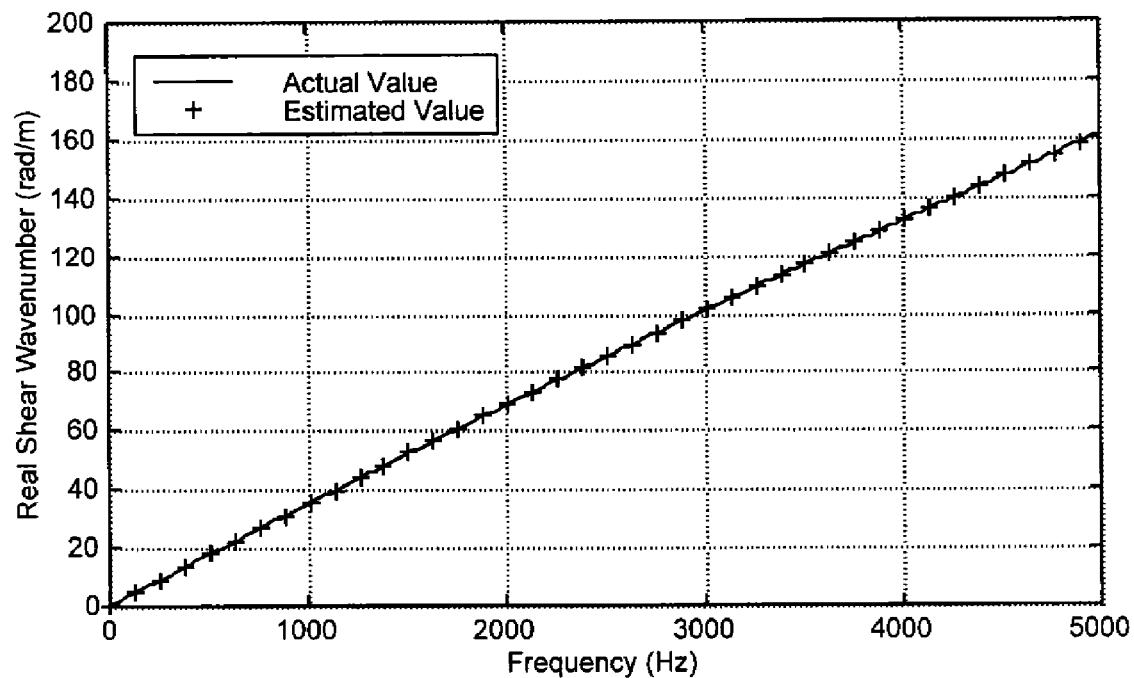
FIGS. 9A and 9B are plots of the real and imaginary portions of the shear wavenumber versus frequency.
Figure 9B:
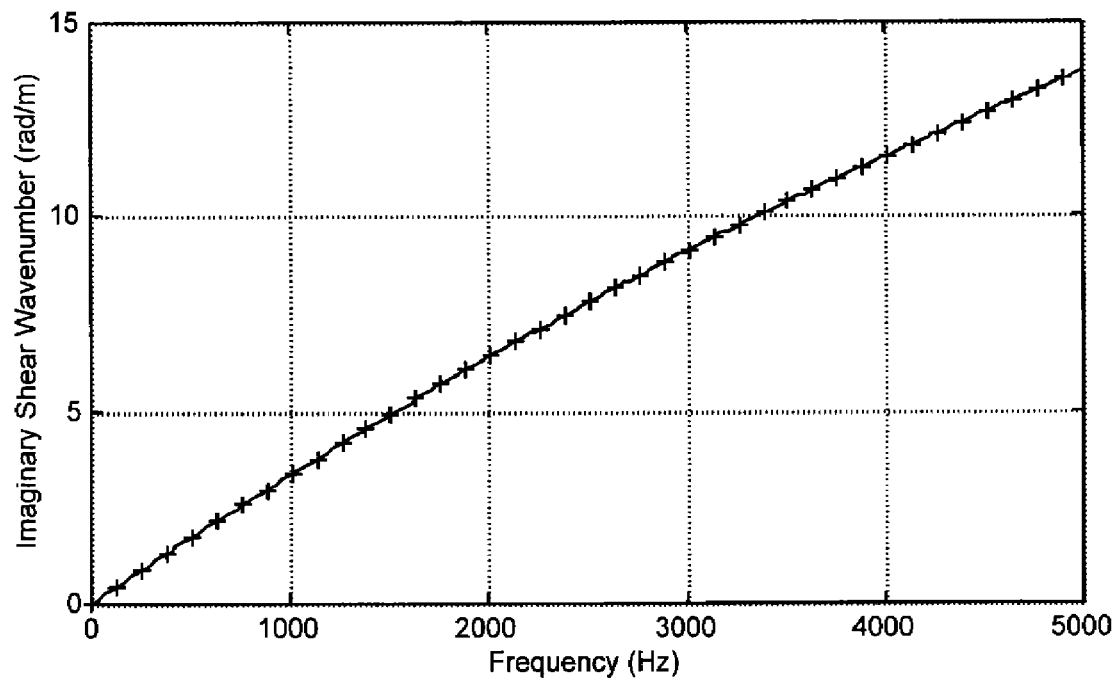

FIGS. 9A and 9B are plots of the real and imaginary portions of the shear wavenumber versus frequency. In both plots, the solid line is the actual wavenumber used to formulate the model and the + markers are the estimated values of the real and imaginary wavenumbers determined using equations (16) and (18), respectively.

Figure 10A:
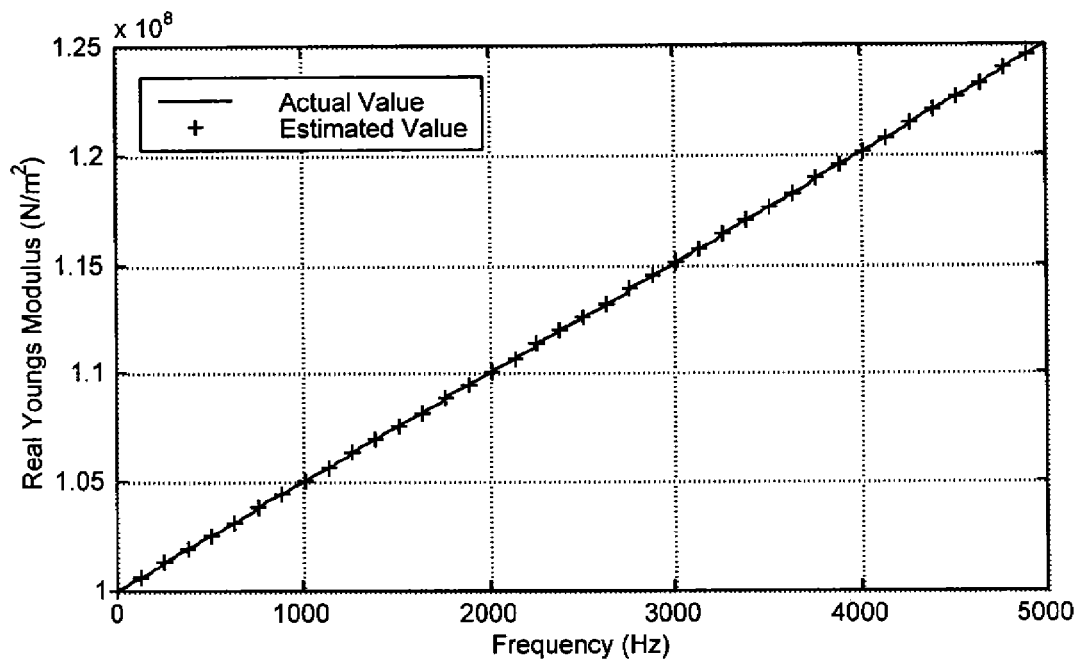
FIGS. 10A and 10B are plots of the real and imaginary portions of Young's modulus versus frequency.
Figure 10B:
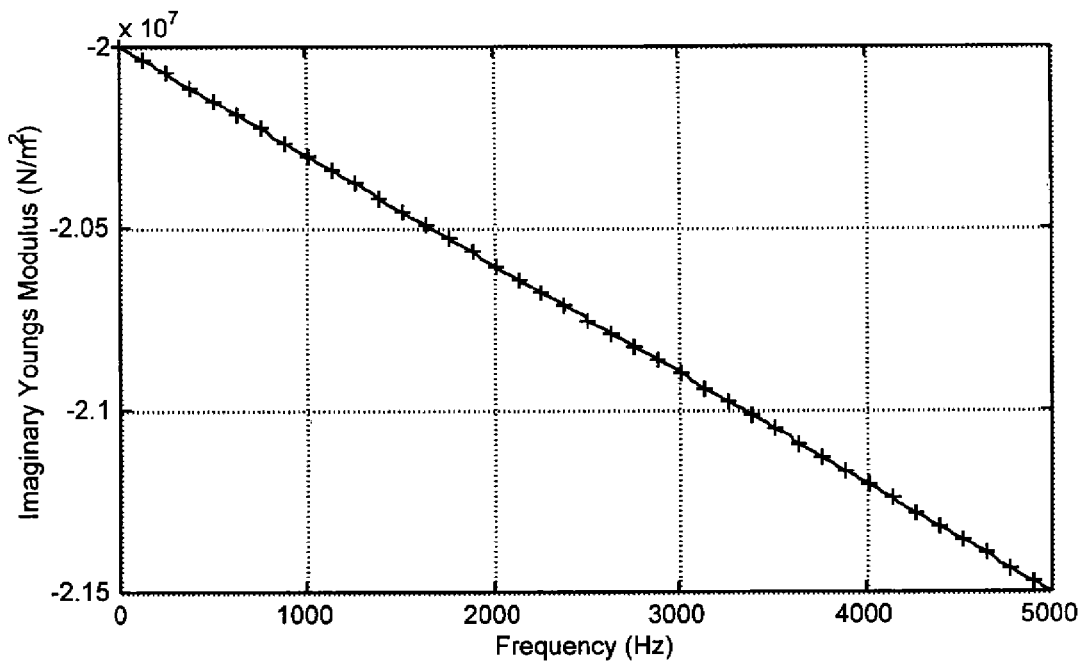
Figure 11A:
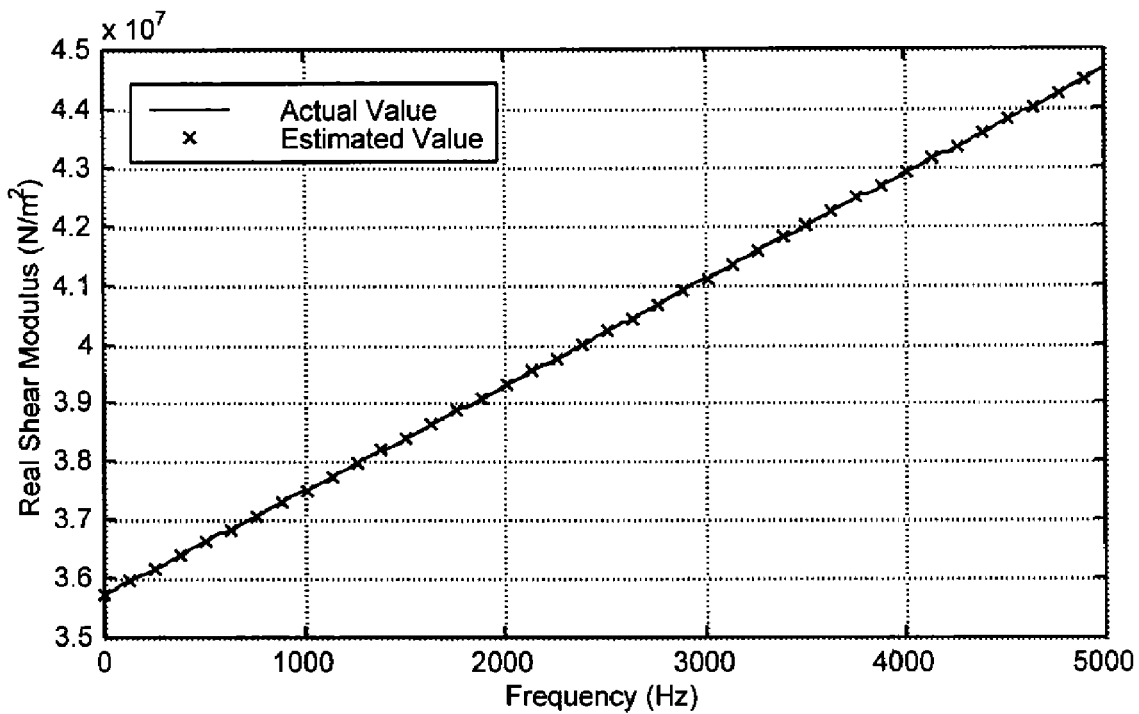
FIGS. 11A and 11B are plots of the real and imaginary portions of shear modulus versus frequency.
Figure 11B:
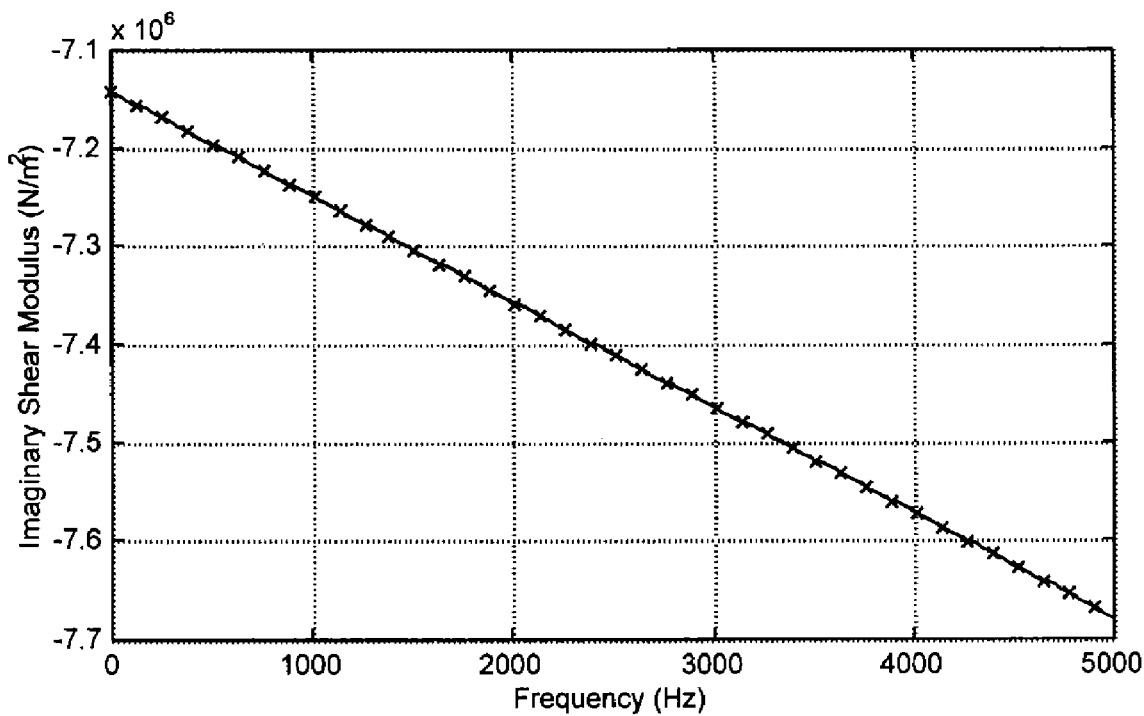
Figure 12:
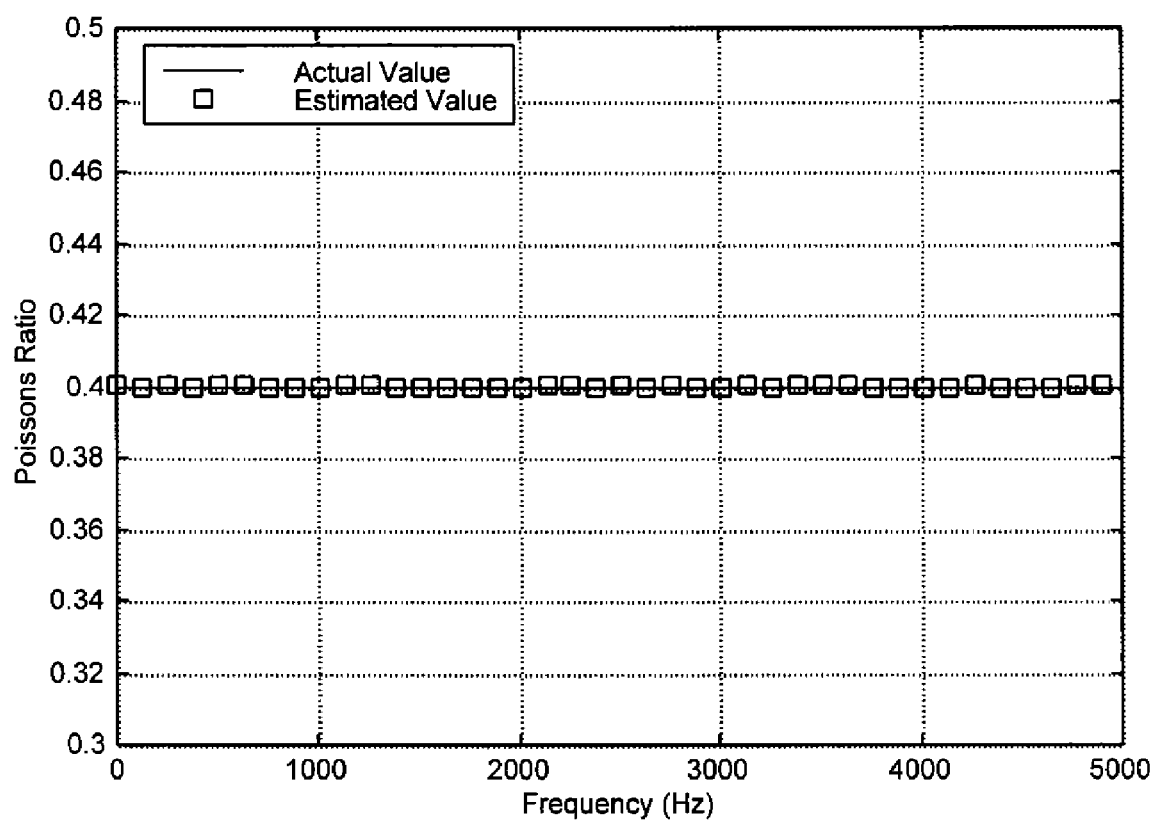
FIG. 12 is a plot of the real part of Poisson's ratio versus frequency.

FIGS. 10A and 10B are plots of the real and imaginary portions of Young's modulus versus frequency. In both plots, the solid line is the actual modulus used to formulate the model and the + markers are the estimated values of real and imaginary Young's modulus determined using equations (19) through (22) and (24). FIGS. 11A and 11B are plots of the real and imaginary portions of shear modulus versus frequency. In both plots, the solid line is the actual modulus used to formulate the model and the x markers are the estimated values of real and imaginary shear modulus determined using equations (19) through (22) and (25). FIG. 12 is a plot of the real part of Poisson's ratio versus frequency. The solid line is the actual ratio used to formulate the model and the square markers are the estimated values of the real part of Poisson's ratio determined using equations (19) through (23). Because the numerical example is formulated using a Poisson's ratio that is strictly real, no imaginary component is shown in this plot. Imaginary values of Poisson's ratio are possible and have been shown to theoretically exist.

This method provides many new features and advantages. It gives the ability to estimate the complex dilatational and shear wavespeeds of a material that is slab-shaped and subjected to compressive forces with closed form expressions. It also allows estimation of the complex Lamé constants of a material that is slab-shaped and subjected to compressive forces with closed form expressions. Other parameters can also be estimated with closed form expressions such as the complex Young's and shear moduli, and complex Poisson's ratio.

In light of the above, it is therefore understood that within the scope of the appended claims, the invention may be practiced otherwise than as specifically described.

What is claimed is:

1. A method for calculating material properties of a material of interest comprising the steps of:
    determining a dilatational wavespeed by:
    conducting a vertical vibration test of a first piece of the material having a first thickness to obtain first transfer function data;
    conducting a vertical vibration test of a second piece of the material having a second thickness to obtain second transfer function data, wherein said second thickness is twice said first thickness; and
    calculating the dilatational wavespeed from said first transfer function and said second transfer function;
    determining a shear wavespeed by:

conducting a horizontal vibration test of a first piece of the material having a first thickness to obtain first shear transfer function data;

conducting a horizontal vibration test of a second piece of the material having a second thickness to obtain second shear transfer function data, wherein said second thickness is twice said first thickness;

calculating the shear wavespeed from said first shear transfer function, said second shear transfer function and said dilatational wavespeed; and providing said calculated shear wavespeed and said calculated dilatational wavespeed from said steps of calculating as the material properties.

2. The method of claim 1 wherein said steps of conducting a vertical vibration test comprise:

providing a sample of a material of interest having a first side and a second side;

subjecting said material to a compressional load;

vibrating the material in a vertical direction at a range of test frequencies using a vibration source;

measuring a first set of material motion parameters at said vibration source for each frequency in the range while the material is vibrating in the vertical direction;

measuring a second set of material motion parameters at an opposite side of said sample from said vibration source for each frequency in the range while the material is vibrating in the vertical direction; and computing a transfer function as a ratio of said second material motion parameters to said first material motion parameters.

3. The method of claim 2 wherein said steps of measuring a first set of material motion parameters and measuring a second set of material motion parameters are conducted by utilizing a laser velocimeter.

4. The method of claim 2 wherein said steps of measuring a first set of material motion parameters and measuring a second set of material motion parameters are conducted by utilizing an accelerometer.

5. The method of claim 1 wherein said steps of conducting a horizontal vibration test comprise:

providing a sample of a material of interest having a first side and a second side;

subjecting said material to a compressional load;

vibrating the material in a horizontal direction at a range of test frequencies using a vibration source;

measuring a first set of material motion parameters at said vibration source for each frequency in the range while the material is vibrating in the horizontal direction;

measuring a second set of material motion parameters at an opposite side of said sample from said vibration source for each frequency in the range while the material is vibrating in the horizontal direction;

computing a transfer function as a ratio of said second material motion parameters to said first material motion parameters; and providing said computed transfer function as one of the material properties.

6. The method of claim 5 wherein said steps of measuring a first set of material motion parameters and measuring a second set of material motion parameters are conducted by utilizing a laser velocimeter.

7. The method of claim 5 wherein said steps of measuring a first set of material motion parameters and measuring a second set of material motion parameters are conducted by utilizing an accelerometer.

8. The method of claim 1 further comprising the step of computing at least one of Lamé constants, Young's modulus, Poisson's ratio, and the shear modulus for the material of interest using said dilatational wavespeed and said shear wavespeed.

9. A method for calculating material properties of a material of interest comprising the steps of:

conducting a vertical vibration test of a first piece of the material having a first thickness to obtain first transfer function data;

conducting a vertical vibration test of a second piece of the material having a second thickness to obtain second transfer function data, wherein said second thickness is twice said first thickness;

calculating the dilatational wavespeed from said first transfer function and said second transfer function; and providing the calculated dilatational wavespeed as one of the material properties.

10. The method of claim 9 further comprising the steps of:

conducting a horizontal vibration test of a first piece of the material having a first thickness to obtain first shear transfer function data;

conducting a horizontal vibration test of a second piece of the material having a second thickness to obtain second shear transfer function data, wherein said second thickness is twice said first thickness;

calculating the shear wavespeed from said first shear transfer function, said second shear transfer function and said dilatational wavespeed; and providing the calculated shear wavespeed as an additional one of the material properties.

11. A method for calculating material properties of a material of interest comprising the steps of:

determining a dilatational wavespeed by:

conducting a vertical vibration test of a first piece of the material having a first thickness to obtain first transfer function data;

conducting a vertical vibration test of a second piece of the material having a second thickness to obtain second transfer function data, wherein said second thickness is twice said first thickness;

calculating the dilatational wavespeed from said first transfer function and said second transfer function;

determining a shear wavespeed by:

conducting a horizontal vibration test of a first piece of the material having a first thickness to obtain first shear transfer function data;

conducting a horizontal vibration test of a second piece of the material having a second thickness to obtain second shear transfer function data, wherein said second thickness is twice said first thickness;

calculating the shear wavespeed from said first shear transfer function, said second shear transfer function and said dilatational wavespeed; and providing plots of said first shear transfer function and said second shear transfer function.

12. The method of claim 11 further comprising the steps of:

computing a dilatational wavenumber from said dilatational wavespeed and a frequency of vibration from said horizontal and vertical vibration tests; and providing plots of said dilatational wavenumber versus frequency.

13. The method of claim 11 further comprising the steps of:

computing a shear wavenumber from said shear wavespeed and a frequency of vibration from said horizontal and vertical vibration tests; and providing plots of said shear wavenumber versus frequency.

14. The method of claim 11 further comprising the steps of:
computing at least one of Lamé constants, Young's modulus, Poisson's ratio, and the shear modulus for the material of interest using said dilatational wavespeed and said shear wavespeed; and
providing a plot of said computed one of Lamé constants, Young's modulus, Poisson's ratio, and the shear modulus for the material of interest.

* * * * *